(12) United States Patent
Li et al.

(10) Patent No.: US 11,778,010 B2
(45) Date of Patent: *Oct. 3, 2023

(54) TECHNIQUES FOR DETERMINING AN UPPER BOUND ON VISUAL QUALITY OVER A COMPLETED STREAMING SESSION

(71) Applicant: NETFLIX, INC., Los Gatos, CA (US)

(72) Inventors: Zhi Li, Mountain View, CA (US); Te-Yuan Huang, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,523

(22) Filed: Feb. 1, 2021

(65) Prior Publication Data

US 2021/0160301 A1 May 27, 2021

Related U.S. Application Data

(63) Continuation of application No. 16/036,600, filed on Jul. 16, 2018, now Pat. No. 10,911,513.

(51) Int. Cl.
*H04L 65/70* (2022.01)
*H04L 65/80* (2022.01)
*H04L 65/613* (2022.01)

(52) U.S. Cl.
CPC ............ *H04L 65/70* (2022.05); *H04L 65/613* (2022.05); *H04L 65/80* (2013.01)

(58) Field of Classification Search
CPC .... H04L 65/607; H04L 65/4092; H04L 65/80
See application file for complete search history.

(56) References Cited

U.S. PATENT DOCUMENTS 5,841,819 A 11/1998 Hu et al.
9,654,528 B1 * 5/2017 Cho ................. H04N 21/23406
(Continued)

FOREIGN PATENT DOCUMENTS

EP 2227023 A1 9/2010
WO 2010/100427 A1 9/2010

OTHER PUBLICATIONS

Ortega et al., "Optimal Trellis-Based Buffered Compression and Fast Approximations", IEEE Transactions on Image Processing, vol. 3, No. 1, Jan. 1, 1994, pp. 26-39.
(Continued)

*Primary Examiner* — Dhairya A Patel
(74) *Attorney, Agent, or Firm* — Artegis Law Group, LLP

(57) ABSTRACT

In various embodiments, a hindsight application computes a hindsight metric value for evaluation of a video rate selection algorithm. The hindsight application determines a first encoding option associated with a source chunk of a media title based on a network throughput trace and a buffer trellis. The hindsight application determines that the first encoding option is associated with a buffered duration range. The buffered duration range is also associated with a second encoding option that is stored in the buffer trellis. After determining that the first encoding option is associated with a higher visual quality than the second encoding option, the hindsight application stores the first encoding option instead of the second encoding option in the buffer trellis to generate a modified buffer trellis. Finally, the hindsight application computes a hindsight metric value associated with a sequence of encoded chunks of the media title based on the modified buffer trellis.

21 Claims, 5 Drawing Sheets

(56) References Cited

U.S. PATENT DOCUMENTS

| | | | |
|---|---|---|---|
| 9,794,601 B2 | 10/2017 | Li et al. | |
| 10,097,609 B1* | 10/2018 | Lasher | H04L 65/61 |
| 10,270,832 B1 | 4/2019 | Hundemer et al. | |
| 2007/0133679 A1 | 6/2007 | Yang et al. | |
| 2010/0074167 A1* | 3/2010 | Dale | H04N 21/2385 |
| | | | 370/321 |
| 2010/0158101 A1* | 6/2010 | Wu | H04N 21/2662 |
| | | | 375/E7.003 |
| 2011/0002377 A1* | 1/2011 | Raveendran | H04H 60/41 |
| | | | 375/E7.026 |
| 2012/0250762 A1 | 10/2012 | Kaye et al. | |
| 2013/0028316 A1* | 1/2013 | Leontaris | H04N 19/11 |
| | | | 375/240.03 |
| 2013/0179590 A1* | 7/2013 | McCarthy | H04N 21/23439 |
| | | | 709/231 |
| 2013/0251333 A1* | 9/2013 | Berbecel | H04N 21/4325 |
| | | | 386/E5.052 |
| 2014/0177734 A1* | 6/2014 | Carmel | H04N 19/197 |
| | | | 375/240.26 |
| 2016/0234078 A1 | 8/2016 | Jana et al. | |
| 2016/0295254 A1 | 10/2016 | Chen et al. | |
| 2016/0366202 A1* | 12/2016 | Phillips | H04L 65/756 |
| 2017/0104804 A1 | 4/2017 | Do et al. | |
| 2017/0223084 A1* | 8/2017 | Lee | H04N 21/8456 |
| 2018/0109799 A1* | 4/2018 | De Cock | H04N 21/234354 |
| 2018/0160161 A1* | 6/2018 | Reznik | H04N 21/23439 |
| 2018/0167431 A1* | 6/2018 | Kim | H04L 43/0864 |
| 2019/0069038 A1* | 2/2019 | Phillips | H04N 21/64769 |
| 2020/0021634 A1 | 1/2020 | Li et al. | |
| 2020/0137134 A1* | 4/2020 | Harold | H04L 65/80 |
| 2021/0289013 A1* | 9/2021 | Bentaleb | H04L 65/613 |
| 2022/0103832 A1* | 3/2022 | Grois | H04N 19/147 |

OTHER PUBLICATIONS

Le et al., "Quality-driven bitrate adaptation method for HTTP live-streaming", IEEE ICC —Workshop on Quality of Experience-based Management for Future Internet Applications and Services (QoE-FI), Jun. 8, 2015, pp. 1771-1776.

Tao et al., "Dynamic Programming-Based Reverse Frame Selection for VBR Video Delivery Under Constrained Resources", IEEE Transactions on Circuits and Systems for Video Technology, vol. 16, No. 11, Nov. 1, 2006, pp. 1362-1375.

Mao et al., "Neural Adaptive Video Streaming with Pensieve", In Proceedings of the Conference of the ACM Special Interest Group on Data Communication (SIGCOMM '17), ACM, DOI:https://doi.org/10.1145/3098822.3098843. Available at http://web.mil.edu/pensieve/contenl/pensieve-tech-report.pdf., 2017, pp. 197-210.

* cited by examiner

TECHNIQUES FOR DETERMINING AN UPPER BOUND ON VISUAL QUALITY OVER A COMPLETED STREAMING SESSION

CROSS-REFERENCE TO RELATED APPLICATIONS

This application is a continuation of the co-pending U.S. patent application titled, "TECHNIQUES FOR DETERMINING AN UPPER BOUND ON VISUAL QUALITY OVER A COMPLETED STREAMING SESSION," filed on Jul. 16, 2018 and having Ser. No. 16/036,600. The subject matter of this related application is hereby incorporated herein by reference.

BACKGROUND

Field of the Various Embodiments

Embodiments of the present invention relate generally to streaming video technology and, more specifically, to techniques for determining an upper bound on visual quality over a completed streaming session.

Description of the Related Art

A typical video streaming service provides access to a library of media titles that can be viewed on a range of different client devices. Each client device may connect to the video streaming service under different connection conditions. In many implementations, a client device that connects to a video streaming service executes an endpoint application. The endpoint application implements a video rate selection algorithm that attempts to optimize the visual quality experienced during playback of the media title on the client device while avoiding playback interruptions due to re-buffering events. In these types of implementations, for each source chunk of a media title, the video rate selection algorithm attempts to selects the highest possible quality encoded version of the chunk to stream to the client device based on the available network throughput.

In general, the overall visual experience that the video streaming service provides to viewers depends on the ability of the video rate selection algorithm to select a sequence of encoded chunks that optimizes visual quality without exceeding the available network throughput. For this reason, evaluating and fine-tuning the performance of video rate selection algorithms is an important aspect of providing an effective video streaming service. To evaluate the quality of a video rate selection algorithm, a hindsight application can be implemented that attempts to retrospectively compute a performance upper bound for the video rate selection algorithm based on a recorded network throughput trace. After computing the performance upper bound, a hindsight comparison application computes gaps between the actual performance of the video rate selection algorithm and the performance upper bound for a variety of completed streaming sessions. The video streaming service provider then investigates the gaps to identify network scenarios during which the performance of the video rate algorithm is subpar. Finally, the video streaming service provider fine-tunes the video rate algorithm to improve the performance for the identified network scenarios. However, retrospectively computing a performance upper bound that accurately reflects the visual quality experienced during playback of the media title is challenging.

Some hindsight applications use a time-weighted bitrate (TWBR) as the performance upper bound. One limitation of TWBR-based hindsight applications is that the complexity of the video content associated with a given media title oftentimes varies across the media title. Consequently, the TWBR does not necessarily reflect human perceived visual quality. Other hindsight applications use a time-weighted subjective visual quality metric as the performance upper bound. As persons skilled in the art will recognize, computing the optimal value for a time-weighted subjective visual quality metric over a streaming session is an NP-hard problem. An NP-hard problem cannot be solved in polynomial time using any known technique. For this reason, quality-based hindsight applications typically implement a dynamic programming process. More specifically, a typical quality-based hindsight application quantizes the duration of a streaming session. The quality-based hindsight application assumes that, for each source chunk, each encoded version of the source chunk can be downloaded at each quantized time. In operation, the quality-based hindsight application sequentially processes each source chunk. For each of the different encoded versions of the source chunk, the quality-based hindsight application emulates and records the reward associated with downloading the encoded chunk at all possible starting times. After processing the final source chunk, the quality-based hindsight application sets the optimal value for the time-weighted subjective visual quality metric based on the sequence of encoded chunks associated with the highest reward.

One limitation of quality-based hindsight applications is that determining the performance upper bound for a completed video streaming session can be prohibitively expensive in terms of execution time, computation resources, and memory resources. In particular, the execution time of quality-based hindsight applications is quadratic.

As the foregoing illustrates, what is needed in the art are more effective techniques for generating a performance upper bound for a video rate selection algorithm.

SUMMARY

One embodiment of the present invention sets forth a computer-implemented method for generating a performance upper bound for a video rate selection algorithm. The method includes computing a first encoding option associated with a first source chunk of a media title based on a network throughput trace and a buffer trellis; determining that the first encoding option is associated with a first buffered duration range; performing a comparison operation between a first metric value included in the first encoding option and a second metric value included in a second encoding option, wherein the second encoding option is stored in the buffer trellis and also is associated with the first buffered duration range; determining that the first encoding option is associated with a higher visual quality than the second encoding option based on the comparison operation; storing the first encoding option instead of the second encoding option in the buffer trellis to generate a modified buffer trellis; and computing a hindsight metric value associated with a sequence of encoded chunks of the media title based on the modified buffer trellis, where the hindsight metric value is used to evaluate the performance of a video rate selection algorithm.

At least one technical advantage of the disclosed techniques relative to prior art is that the execution time required to compute an accurate visual quality upper bound for a streaming session is polynomial. More specifically, the disclosed techniques may be used to determine an upper bound for a subjective visual quality metric that reliably predicts perceived video quality across a diverse range of media titles. Further, the disclosed techniques incrementally generate and discard sequences of encoded chunks based on different combinations of source chunks and buffered duration ranges. Consequently, the time, computational resources, and storage resources required to determine the upper bound for the subjective visual quality metric are significantly reduced compared to prior art techniques. These technical advantages provide a substantial technological advancement over prior art solutions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
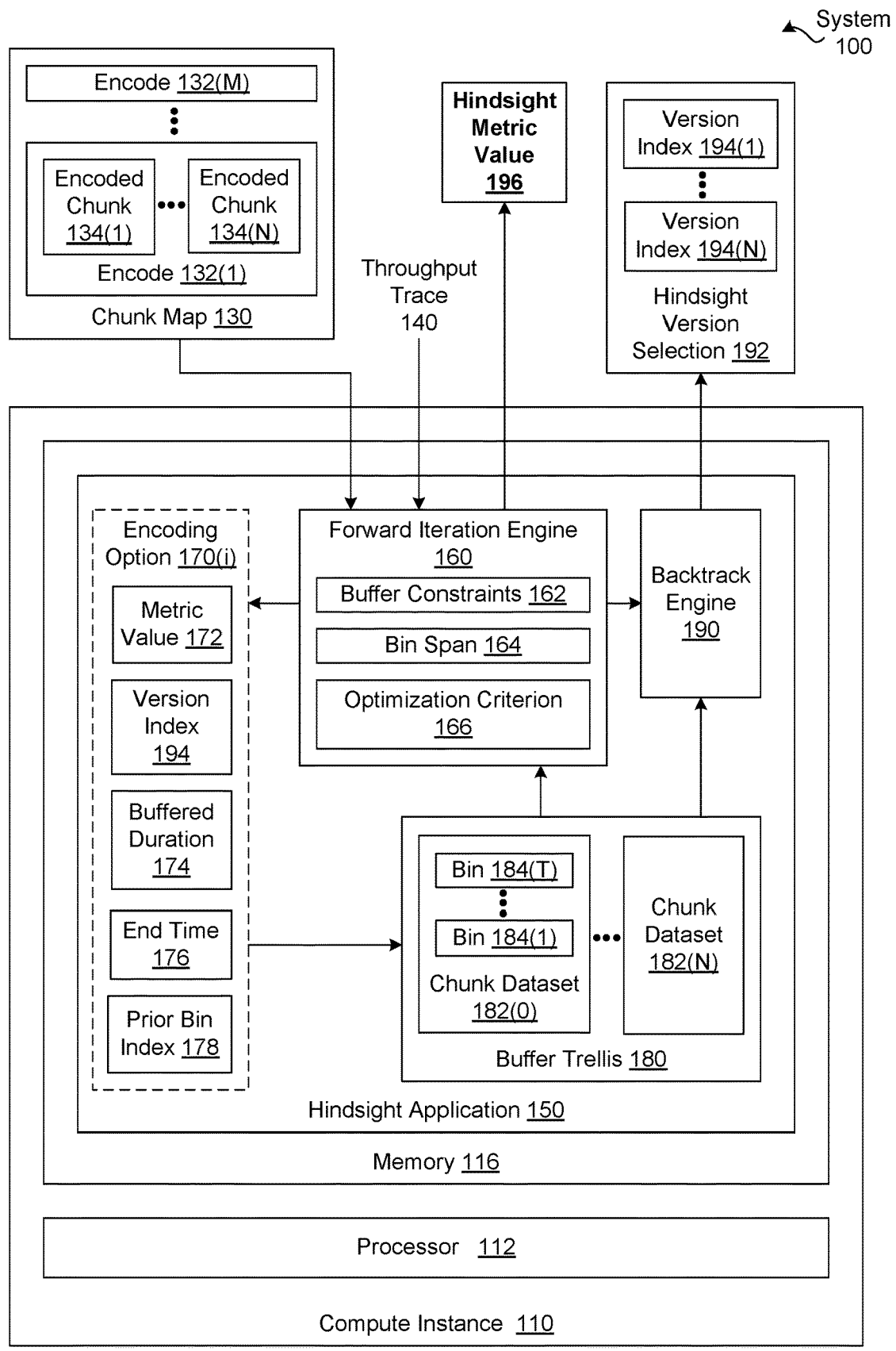
FIG. 1 is a conceptual illustration of a system configured to implement one or more aspects of the present invention.

In the following description, numerous specific details are set forth to provide a more thorough understanding of the present invention. However, it will be apparent to one of skilled in the art that the present invention may be practiced without one or more of these specific details.

The overall visual experience that a video streaming service provides to viewers depends on the ability of a video rate selection algorithm operating on the user-side device to select a sequence of encoded chunks that optimizes visual quality from the user's perspective without exceeding the available network throughput. Therefore, being able to evaluate the efficacy of different video rate selection algorithms is an important factor in the video streaming service's ability to provide high-quality viewing experiences to customers. Prior art techniques for evaluating the performance of video rate selection algorithms are prohibitively time consuming or do not optimize visual quality very well. For example, some prior-art techniques compare the average number of bits that are used to encode the video content viewed during a completed streaming session to an upper bound on the average number of bits that can be used to encode that same video content to gauge the effectiveness of a given video rate selection algorithm. However, the average number of bits used to encode video content does not necessarily correlate to an average visual quality. As is well-understood, in some instances, the number of bits required to encode a low-quality action sequence could be greater than the number of bits required to encode a high-quality monologue. Thus, such prior art techniques do not properly account for visual quality from the user's perspective. With the disclosed techniques, however, a video streaming service can efficiently compare the average visual quality experienced by a user during a completed streaming session to a more accurate upper bound on the average visual quality. If the comparison indicates that the performance of the video rate selection algorithm is sub-optimal, then the video streaming service can fine-tune the video rate selection algorithm to enhance the overall customer viewing experience going forward.

In various embodiments, a hindsight application uses dynamic programming techniques to incrementally generate and evaluate sequences of encoded chunks derived from a media title based on a network trace of a completed streaming session. The hindsight application partitions the media title into N source chunks and sequentially processes each source chunk. For the nth source chunk, the hindsight application generates sequences of n encoded chunks based on shorter sequences of (n−1) encoded chunks. For each of the newly generated sequences, the hindsight application computes a metric value and a buffered duration. A buffered duration is the total playback duration of encoded content stored in a client buffer.

As part of processing each source chunk, the hindsight application discards any number of sub-optimal sequences based on the metric values. More specifically, the hindsight application maps each of the newly generated sequences to one of multiple buffered duration ranges. For each buffered duration range, the hindsight application retains at most one of the newly generated sequences and discards any sub-optimal sequences. After processing the final (Nth) source chunk, the hindsight application selects the optimized sequence of N encoded chunks based on the metric values. The hindsight application then generates the optimized version selection and associated hindsight metric value based on the selected sequence of N encoded chunks.

Advantageously, the hindsight application addresses various limitations of conventional hindsight applications. More specifically, conventional hindsight applications compute an upper bound for a time-weighted bitrate (TWBR) that does not necessarily reflect the visual quality experienced during playback of the media title. For example, the TWBR for a particular encoded chunk that is associated with a low visual quality and corresponds to an action sequence may be higher than the TWBR for another encoded chunk that is associated with a high visual quality and corresponds to a monologue. By contrast, the hindsight application optimizes a metric that accurately reflects the visual quality experienced during playback of the media title. One example of such a metric is a time-weighted video multimethod assessment fusion (VMAF) score that correlates to the actual visual quality of video content irrespective of the complexity of the video content Further, by retaining only a single encoded sequence for each combination of source chunk and buffered duration range, the time and memory required to compute an upper bound on a visual quality score for the media title via the hindsight application are reduced. For example, the time required to compute an upper bound on a visual quality score for a movie via the disclosed techniques could be on the order of thousands of times less than the time required to compute an upper bound of the visual quality score for the movie via conventional techniques.

A video service provider may use the hindsight application to determine gaps between the actual visual quality provided during a variety of completed streaming sessions and the performance upper bounds for the completed sessions. The video service provider may then investigates the gaps to identify network scenarios during which the performance of an associated video rate algorithm is subpar. Finally, the video streaming service provider may fine-tune the video rate selection algorithm to improve the performance for the identified network scenarios.

System Overview

FIG. 1 is a conceptual illustration of a system 100 configured to implement one or more aspects of the present invention. As shown, the system 100 includes, without limitation, a compute instance 110. In alternate embodiments, the system 100 may include any number of compute instances 110. For explanatory purposes, multiple instances of like objects are denoted with reference numbers identifying the object and parenthetical numbers identifying the instance where needed. In various embodiments, any number of the components of the system 100 may be distributed across multiple geographic locations or included in one or more cloud computing environments (i.e., encapsulated shared resources, software, data, etc.) in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instance 110 is configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

In particular, the compute instance 110 is configured to generate one or more evaluation criteria for a video rate selection algorithm associated with video streaming services. A typical video streaming service provides access to a library of media titles that can be viewed on a range of different client devices. Each client device may connect to the video streaming service under different connection conditions. In many implementations, a client device that connects to a video streaming service executes an endpoint application. The endpoint application implements a video rate selection algorithm that attempts to optimize the visual quality experienced during playback of the media title on the client device while avoiding playback interruptions due to re-buffering events. In these types of implementations, for each source chunk of a media title, the video rate selection algorithm attempts to selects the highest possible quality encoded version of the chunk to stream to the client device based on the available network throughput.

In general, the overall visual experience that the video streaming service provides to viewers depends on the ability of the video rate selection algorithm to select a sequence of encoded chunks that optimizes visual quality without exceeding the available network throughput. For this reason, evaluating and fine-tuning the performance of video rate selection algorithms is an important aspect of providing an effective video streaming service. To evaluate the quality of a video rate selection algorithm, a hindsight application can be implemented that attempts to retrospectively compute a performance upper bound for the video rate selection algorithm based on a recorded network throughput trace. After computing the performance upper bound, a hindsight comparison application computes gaps between the actual performance of the video rate selection algorithm and the performance upper bound for a variety of completed streaming sessions. The video streaming service provider then investigates the gaps to identify network scenarios during which the performance of the video rate algorithm is subpar. Finally, the video streaming service provider fine-tunes the video rate algorithm to improve the performance for the identified network scenarios. However, retrospectively computing a performance upper bound that accurately reflects the visual quality experienced during playback of the media title is challenging.

Some hindsight applications use a time-weighted bitrate (TWBR) as the performance upper bound. One limitation of TWBR-based hindsight applications is that the complexity of the video content associated with a given media title oftentimes varies across the media title. Consequently, the TWBR does not necessarily reflect human perceived visual quality. Other hindsight applications use a time-weighted subjective visual quality metric as the performance upper bound. As persons skilled in the art will recognize, computing the optimal value for a time-weighted subjective visual quality metric over a streaming session is an NP-hard problem. An NP-hard problem cannot be solved in polynomial time using any known technique. For this reason, quality-based hindsight applications typically implement a dynamic programming process. More specifically, a typical quality-based hindsight application quantizes the duration of a streaming session. The quality-based hindsight application assumes that, for each source chunk, each encoded version of the source chunk can be downloaded at each quantized time. In operation, the quality-based hindsight application sequentially processes each source chunk. For each of the different encoded versions of the source chunk, the quality-based hindsight application emulates and records the reward associated with downloading the encoded chunk at all possible starting times. After processing the final source chunk, the quality-based hindsight application sets the optimal value for the time-weighted subjective visual quality metric based on the sequence of encoded chunks associated with the highest reward.

One limitation of quality-based hindsight applications is that determining the performance upper bound for a completed video streaming session can be prohibitively expensive in terms of execution time, computation resources, and memory resources. In particular, the execution time of quality-based hindsight applications is quadratic.

Generating Evaluation Criteria for Rate Selection Algorithms in Polynomial Execution Time To address the above problems, the system 100 includes, without limitation, a hindsight application 150. The hindsight application 150 resides in the memory 116 and executes on the processor 112 in polynomial time. The hindsight application 150 implements dynamic programming to generate a hindsight metric value 196 that characterizes a hindsight version selection 192 based on a throughput trace 140 and a chunk map 130 associated with a media title. The throughput trace 140 is a network throughput trace that indicates the available network bandwidth as a function of time over a completed streaming session.

Although not shown in FIG. 1, the media title is partitioned into N source chunks of video content. As shown, the chunk map 130 includes, without limitation, M encodes 132, where each of the encodes 132 is a different encoded version of the media title. Each of the encodes 132 is partitioned into N encoded chunks 134, where each encoded chunk 134 includes encoded video content derived from the corresponding source chunk. As persons skilled in the art will recognize, during a streaming session, the endpoint application may select and download different encoded chunks 134 of different encodes 132 in any combination. For example, the client application could consecutively download the encoded chunk 132(1) of the encode 132(5), the encoded chunk 132(2) of the encode 132(3), the encoded chunk 132(3) of the encode 132(1), etc. In alternate embodiments, the chunk map 130 may be specified in any technically feasible fashion.

The hindsight version selection 192 specifies an optimized sequence of encoded chunks 132 that would retrospectively be downloaded during the streaming session characterized by on the throughput trace 140. As shown, the hindsight version selection 192 includes, without limitation, N version indices 194. The version 194($n$) is an integer m in the range of 1-M that specifies the encoded chunk 132($n$) of the encode 132($m$). For example, a version 194(45) that is equal to 3 specifies the encoded chunk 132(45) of the encode 132(3). In this fashion, for each of the source chunks, the hindsight version selection 192 specifies the optimized encoded version of the source chunk. In alternate embodiments, the hindsight version selection 192 may be specified in any technically feasible fashion.

The hindsight metric value 196 is the value of any metric that is relevant to evaluating the visual quality experienced during playback of the media title when streamed to a client device. For instance, in various embodiments, the hindsight metric value 196 is the maximum time-weighted video multimethod assessment fusion (VMAF) score associated with the hindsight version selection 192. In other embodiments, the hindsight metric value 196 is the maximum worst-case VMAF score associated with the hindsight version selection 192. In yet other embodiments, the hindsight metric value 196 is the time-weighted harmonic VMAF score associated with the hindsight version selection 192. In various embodiments, the hindsight metric value 196 is the time-weighted bitrate associated with the hindsight version selection 192.

In alternate embodiments, the hindsight application 150 may generate any number of additional hindsight metric values 196. For instance, in some embodiments, the hindsight application 150 may generate the time-weighted average bitrate associated with the hindsight version selection 192. In the same or other alternate embodiments, the hindsight version selection 192 may be omitted.

As shown, the hindsight application 150 includes, without limitation, a forward iteration engine 160, a buffer trellis 180, any number of encoding options 170, and a backtrack engine 190. The forward iteration engine 160 includes, without limitation, any number of buffer constraints 162, a bin span 164, and one or more optimization criterion 166. Upon receiving the chunk map 130 and the throughput trace 140, the forward iteration engine 160 generates and incrementally populates the buffer trellis 180. In general, the forward iteration engine 160 stores different sequences of the encoded chunks 134 in the buffer trellis 180 as backwardly linked lists of the encoding options 170.

The buffer trellis 180 includes, without limitation, N+1 chunk datasets 182. The zeroth chunk dataset 182(0) represents an initial state. Each subsequent chunk dataset 182($n$) is associated with the encoded chunks 134($n$). Each chunk dataset 182 includes, without limitation, T bins 184. The forward iteration engine 160 determines the number of bins 184 included in each of the chunk datasets 182 based on the buffer constraints 162 and the bin span 164. The buffer constraints 162 describe constraints associated with a client buffer (not shown) that resides in memory associated with the client device. The client buffer temporarily stores encoded data as the client application downloads encoded chunks 134 from a server (not shown) during a streaming session.

The buffer constraints 162 include, without limitation, an initial buffered duration, a minimum buffered duration, and a maximum buffered duration. The initial buffered duration specifies a total playback duration associated with encoded video data that is stored in the client buffer before the endpoint application downloads the first encoded chunk 134. The minimum buffered duration specifies a minimum playback duration associated with the encoded video data that is stored in the client buffer. The maximum buffered duration specifies a maximum playback duration associated with the encoded video data that is stored in the client buffer. The buffer constraints 162 may be defined in any technically feasible fashion that is consistent with the capabilities and/or desired behavior of the client device. For instance, in some embodiments, the initial buffered duration is equal to the playback duration of any number of promotional clips that are streamed for playback via the client device prior to the streaming of the media title.

During an initialization process, the forward iteration engine 160 calculates the difference between the maximum buffered duration and the minimum buffered duration. The forward iteration engine 160 then divides the calculated difference by the bin span 164 to determine the number of bins 184 included in each of the chunk datasets 182. For each of the chunk datasets 182, the forward iteration engine 160 partitions the total range between the minimum buffered duration and the maximum buffered duration into T discrete, non-overlapping, and contiguous buffered duration ranges. Each of the buffered duration ranges has a size equal to the bin span 164.

For example, suppose that the minimum buffered duration was 0 seconds, the maximum buffered duration was 8 seconds, and the bin span 184 was 1 second. The forward iteration engine 160 would include eight different bins 184 in each of the different chunk datasets 182. For each of the chunk datasets 182, the forward iteration engine 160 would associate the first bin 184 with the buffered duration range of 0-1 seconds, the second bin 184 with the buffered duration range of 1-2 seconds, and so forth.

Notably, at any given point in time, the forward iteration engine 160 stores, at most, one encoding option 170 in each of the bins 184. More specifically, each of the populated bins 184 included in the chunk dataset 182(n) stores at most one encoding option 170(i), and the encoding option 170(i) is associated with one of the encoded chunks 134(n). If a given bin 184 stores one of the encoding options 170, then the bin 184 is referred to herein as a "populated" bin 184. Otherwise, the bin 184 is referred to as an "empty" bin 184.

As part of the initialization process, the forward iteration engine 160 populates a single bin 184 included in the chunk dataset 182(0). In operation, the forward iteration engine 160 generates an initial encoding option 170(0) specifying the initial buffered duration. The forward iteration engine 160 then maps the initial encoding option 170(0) to a buffered duration range and selects the bin 184 included in the chunk dataset 182(0) that corresponds to the buffered duration range. Subsequently, the forward iteration engine 160 stores the initial encoding option 170(0) in the selected bin 184.

The forward iteration engine 160 then consecutively populates each of the datasets 182(1)-182(N) based on the previously populated datasets 182. In general, to populate a current chunk dataset 182(n), the forward iteration engine 160 individually processes each populated bin 184 included in the prior chunk dataset 182(n−1). For explanatory purposes only, at any given time, one of the populated bins 184 included in the prior chunk dataset 182(n−1) is referred to herein a prior bin 184. To process the prior bin 184, the forward iteration engine 160 computes M new encoding options 170, where M is the number of different encodes 132 included in the chunk map 130. For a given encode 132(m), the forward iteration engine 150 selects the encoded chunk 134(n). The forward iteration engine 160 then computes a new encoding option 170 based on the throughput trace 140, the prior bin 184, and the selected encoded chunk 134(n).

The new encoding option 170 is associated with a new sequence of encoded chunks 134(1)-134(n) that results from appending the selected encoded chunk 134(n) to the end of a previously generated sequence of encoded chunks 134(1)-134(n−1). As shown, each encoding option 170 includes, without limitation, the version index 194, a prior bin index 178, a metric value 172, an end time 176, and a buffered duration 174. The version index 194 specifies the encode 182 that includes the final encoded chunk 134 of the sequence of encoded chunks 134 associated with the encoding option 170. The prior bin index 178 is a backtracking link that specifies the bin 184 storing the previously generated sequence of encoded chunks 134 to which the final encoded chunk 134 is appended. The metric value 172 is a cumulative metric value that characterizes the associated sequence of encoded chunks 194. Examples of cumulative metric values includes, without limitation, a time-weighted average quality score and a worst-case quality score.

The forward iteration engine 160 computes the metric value 172 included in the new encoding option 170 based on the metric value 172 stored in the prior bin 184 and a visual quality score associated with the selected encoded chunk 134(n). The forward iteration engine 160 may compute the visual quality score associated with the selected encoded chunk 134(n) in any technically feasible fashion.

For instance, in some embodiments, to compute the visual quality score, the forward iteration engine 160 transmits the selected encoded chunk 134(n) to a quality score engine (not shown). The forward iteration engine 160 may also transit the corresponding source chunk to the quality score engine. After computing the visual quality score associated with the selected encoded chunk 134(n), the quality score engine transmits the visual quality score to the forward iteration engine 160. The quality score engine may compute the visual quality score in any technically feasible fashion.

The forward iteration engine 160 then computes the metric value 172 for the new sequence of encoded chunks 134. As described in detail below, the forward iteration engine 160 may compute the metric value 172 for the new sequence of encoded chunks 134 in any technically feasible fashion. In alternate embodiments, the forward iteration engine 160 may compute values for any number and type of metrics. For instances, in some embodiments, the forward iteration engine 160 implements an algorithm that computes both worst-case VMAF scores and time-weighted VMAF scores.

To compute the buffered duration 174 and the end time 176, the forward iteration engine 160 emulates some of the behavior of an endpoint application during a streaming session. During the streaming session, the endpoint application consecutively selects and downloads encoded chunks 134 from a server (not shown). First, a rate selection algorithm selects one of the encodes 132, and the endpoint application downloads the encoded chunk 134(1) of the selected encode 132. Subsequently, the rate selection algorithm selects either the same encode 132 or a different encode 132, and the endpoint application downloads the encoded chunk 134(2) of the selected encode 132. The client application continues in this fashion until the client application downloads one of the encoded chunks 134(N). As the client application downloads the encoded chunks 134, the client application consecutively stores the encoded chunks 134 in the client buffer.

As part of computing a new encoding option 170, the forward iteration engine 160 computes the time duration D(n) required to download the selected encoded chunk 134(n) after downloading the encoded chunk 134(n−1) associated with the prior bin 184. The forward iteration engine 160 computes the time required to download the selected encoded chunk 134(n) based on the throughput trace 140, the end time 176 at which the previous encoded chunk 134(n−1) finished downloading, the playback duration of the corresponding source chunk and the bitrate associated with the encoded chunk 134. In some embodiments, the forward iteration engine 160 solves the following equation (1) for D(n):

$$\int_{t(n-1)}^{t(n-1)+D(n)} T(t)dt = R(n,m) \times \tau(n) \quad (1)$$

In equation (1), t is time and t(n−1) denotes the end time 176 at which the previous encoded chunk 134(n−1) finishes downloading. T(t) is the throughput trace, R(n, m) is the bitrate associated with the selected encoded chunk 134(n) included in the selected encode 132(m), and τ(n) is the playback duration of the corresponding source chunk. As persons skilled in the art will recognize, the playback duration of a given encoded chunk 144 derived from a given source chunk is equal to the playback duration of any other encoded chunk 144 derived from the source chunk. The forward iteration engine 160 sets the end time 176 included in the new encoding option 170 equal to the sum of the end time 176 stored in the prior bin 182 and the time duration D(n).

While downloading the encoded chunks 134, the client application depletes the client buffer as the client device playbacks video content derived from previously downloaded encoded chunks 134. In particular, the client application retrieves and deletes encoded video data from the client buffer in the same order in which the encoded video data was stored in the client buffer. As described in conjunction with equation (2), D(n) represents the time duration D(n) required to download a particular encoded chunk 134. Accordingly, D(n) also represents the playback time that is depleted from the client buffer while the encoded chunk 134(n) downloads to the client device.

In a complementary fashion, $\tau(n)$ is both the playback duration of the source chunk corresponding to the encoded chunk 134(n) and the playback time that is replenished to the client buffer after the encoded chunk 134(n) downloads to the client device. For the end time 176 included in the new encoding option 170, the forward iteration engine 160 computes the buffered duration 174 B(n) included in the new encoding option 170. In some embodiments, the forward iteration engine 160 computes the buffered duration 174 B(n) recursively based on the buffered duration 174 B(n−1) associated with the prior bin 184 as per the following equation (2):

$$B(n) = B(n-1) - D(n) + \tau(n) \quad (2)$$

After computing the buffered duration 174 included in the new encoding option 170, the forward iteration engine 160 determines whether the "before replenishment" buffered duration (B(n)−$\tau$(n)) is less than the minimum buffered duration. If the before replenishment buffered duration is less than the minimum buffered duration, then the forward iteration engine 160 determines that the new encoding option 170 is associated with a re-buffering event and discards the new encoding option 170. In general, when a re-buffering event occurs, the client device pauses playback of the media title to accommodate an empty client buffer.

Otherwise, the forward iteration engine 160 determines whether the buffered duration 174 exceeds the maximum buffered duration. If the buffered duration 174 exceeds the maximum buffered duration, then the forward iteration engine 160 determines that the new encoding option 170 is associated with an off-interval event and discards the new encoding option 170. In general, when an off-interval event occurs, the client device pauses download operations to avoid exceeding the capacity of the client buffer.

Otherwise, the forward iteration engine 160 maps the buffered duration 174 to a "current" bin 184 included in the current chunk dataset 182(n). More specifically, the forward iteration engine 160 sets the current bin 184 equal to the bin 184 included in the current chunk dataset 182(n) corresponding to the buffered duration range within which the buffered duration 174 lies. If the current bin 184 is not populated, then the forward iteration engine 160 stores the new encoding option 170 in the current bin 184. If, however, the current bin 184 is already populated, then the forward iteration engine 160 determines whether to overwrite the encoding option 170 currently stored in the current bin 184 with the new encoding option 170.

The forward iteration engine 160 determines whether to overwrite the encoding option 170 current stored in the current bin 184 based on the optimization criterion 166. More precisely, the forward iteration engine 160 determines whether the metric value 172 included in the new encoding option 170 is superior to the metric value 172 included in the prior encoding option 170 with respect to the optimization criterion 166.

For instance, in some embodiments, the optimization criterion 166 configures the forward iteration engine 160 to maximize the time-weighted quality score based on the following summation (3):

$$\sum_{n=1}^{N} \tau(n) \times Q(n) \quad (3)$$

In the summation (3), Q(n) is the quality score associated with the selected encoded chunk 134(n). Accordingly, in such embodiments, the metric value 172 is a time-weighted quality score. In operation, to compute the metric value 172 included in the new encoding option 170, the forward iteration engine 160 computes the product of the quality score of the selected encoded chunk 134(n) and the playback duration associated with the corresponding source chunk. The forward iteration engine 160 then adds the computed product to the metric value 172 stored in the prior bin 184.

In other embodiments, the optimization criterion 164 may configure the forward iteration engine 160 to maximize the worst-case quality score based on the following equation (4):

$$\max \min_{n=1,\ldots,N} Q(n) \quad (4)$$

Accordingly, in such embodiments, the metric value 172 is a worst-case quality score. In operation, the forward iteration engine 160 sets the metric value 172 included in the new encoding option 170 to the smaller of the quality score associated with the selected encoded chunk 134(n) and the metric value 172 stored in the prior bin 184.

After computing the metric value 172 included in the new encoding option 170, the forward iteration engine 160 compares the metric value 172 included in the new encoding option 170 to the metric value 172 stored in the current bin 184. If the metric value 172 included in the new encoding option 170 exceeds the metric value 172 stored in the current bin 184, then the forward iteration engine 160 stores the new encoding option 170 (instead of the current encoding option 170) in the current bin 184. If, however, the metric value 172 included in the new encoding option 170 does not exceed the metric value 172 stored in the current bin 184, then the forward iteration engine 160 discards the new encoding option 170.

After populating the current chunk dataset 182(n), the forward iteration engine 160 verifies that at least one of the bins 184 included in the chunk dataset 182(n) is populated. If none of the bins 184 included in the dataset 182(n) are populated, then the forward iteration engine 160 mitigates the associated re-buffering event or the off-interval event. To mitigate a re-buffering event, the forward iteration engine 160 repopulates the chunk datasets 182(1)-182(n−1) to specify the lowest bitrate sequence of the encoded chunks 134(1)-134(n−1). In the lowest bitrate sequence, each of the encoded chunks 134(1)-134(n−1) has the lowest available bitrate. The forward iteration engine 160 then sets the buffered duration 174 equal to a predetermined re-buffering duration greater than or equal to the minimum buffered duration.

By contrast, to mitigate an off-interval event, the forward iteration engine 160 repopulates the chunk datasets 182(1)-182(n−1) to specify the highest bitrate sequence of the encoded chunks 134(1)-134(n−1). In the highest bitrate sequence, each of the encoded chunks 134(1)-134(n−1) has the highest available bitrate. The forward iteration engine 160 then sets a buffered duration prior to the download of the encoded chunk 134(n) equal to the maximum buffered duration.

After the forward iteration engine 160 populates the last chunk dataset 182(N), the forward iteration engine 160 selects one of the populated bins 184 included in the chunk dataset 182(N) based on the optimization criterion 166. More precisely, the forward iteration engine 190 performs comparison operations between the metric values 172 stored in the populated bins 184 included in the chunk dataset 182(N). The forward iteration engine 190 selects the populated bins 184 storing the metric value 172 that is superior to the other metric values 172 with respect to the optimization criteria 166. For instance, to maximize the time-weighted quality score, the forward iteration engine 190 selects the populated bin 184 storing the highest metric value 172, where the metric value 172 is the time-weighted quality score.

The forward iteration engine 160 sets the hindsight metric value 196 equal to the metric value 172 stored in the selected bin 184. The forward iteration engine 160 then sets a current bin 184 equal to the selected bin 184 and initializes the hindsight version selection 192 to specify the version index 194 stored in the current bin 184. The backtrack engine 190 sets a new current bin 184 based on the prior bin index 178 stored in the current bin 184. Subsequently, the backtrack engine 190 prepends the version index 194 stored in the new current bin 184 to the hindsight version selection 192. The backtrack engine 190 continues to perform backtracking operations in this fashion until reaching the initial bin 184 included in the chunk dataset 182(0). When the backtrack engine 190 reaches the initial bin 184, the hindsight version selection 192 specifies an optimized sequence of encoded chunks 134 that, together, span the playback time of the media title and are associated with the optimized hindsight metric value 196.

Advantageously, the hindsight metric value 196 and the hindsight version selection 192 may be used to retrospectively evaluate the performance of the rate selection algorithm that the endpoint application executed during the streaming session associated with the throughput trace 140. Notably, the time required to execute the hindsight application 150 is on the order of the product of the number of source chunks, the number of buffered duration ranges, and the number of encodes 132. Further, the memory resources consumed during the execution of the hindsight application 150 is on the order of the product of the number of source chunks and the number of encodes 132.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to progressively generating, evaluating, and discarding sequences of encoded chunks based on buffered durations and any number and type of optimization criteria subject to any number and type of buffer constraints.

Figure 2A:
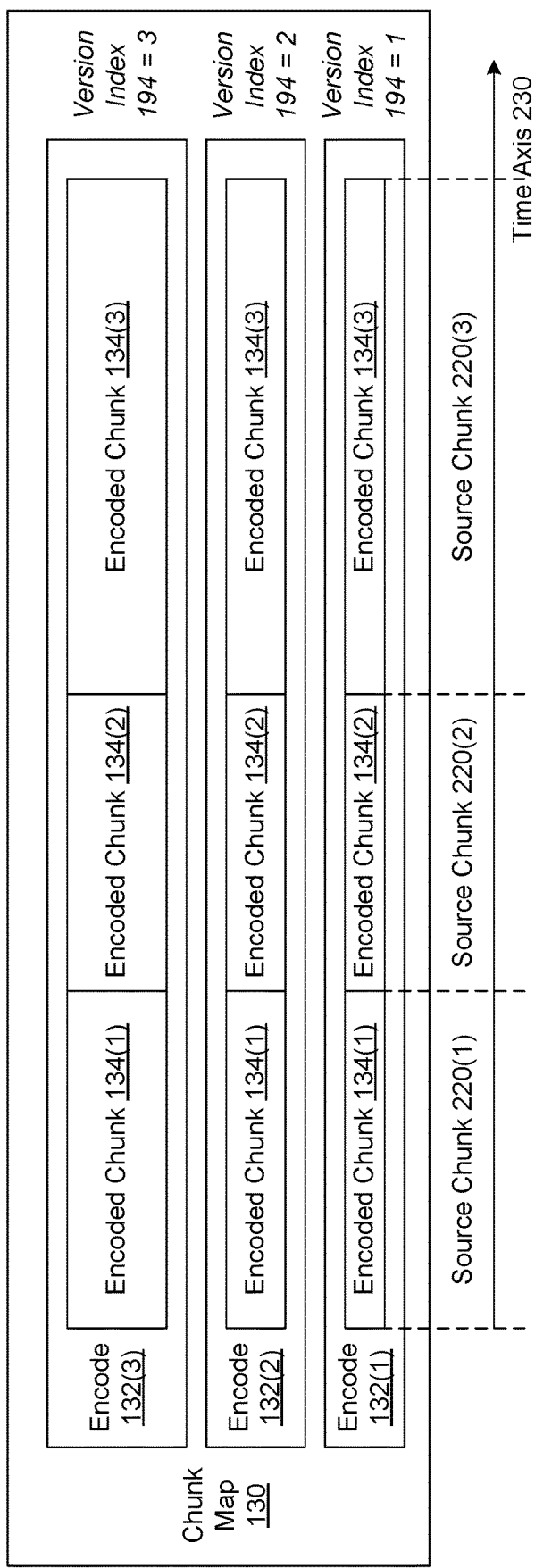
FIG. 2A illustrates an example of the chunk map of FIG. 1, according to various embodiments of the present invention.

FIG. 2A illustrates an example of the chunk map 130 of FIG. 1, according to various embodiments of the present invention. As shown, the media title is partitioned into three source chunks 220(1)-220(3). For explanatory purposes, the playback duration of each of the three source chunks 220 is visually depicted along a time axis 230. The chunk map 130 includes, without limitation, the three encodes 132(1)-132(3). The encode 132(1) is associated with the version index 194 of 1, the encode 132(2) is associated with the version index 194 of 2, and the encode 132(3) is associated with the version index 194 of 3.

Each of the encodes 132 includes, without limitation, three different encoded chunks 134(1)-134(3). As described in conjunction with FIG. 1, the three encoded chunks 134(n) are all derived from the source chunk 220(n). Consequently, the playback duration associated with each of the encoded chunks 134(n) is equal to the playback duration of the source chunk 220(n) irrespective of the encode 132 that includes the encoded chunk 134(n). For example, the three encoded chunks 134(2) are derived from the source chunk 220(2). Consequently, the playback duration associated with each of the encoded chunks 134(2) is equal to the playback duration of the source chunk 220(2).

Each of the encodes 132 is associated with a different bitrate. For explanatory purposes only, the encode 132(3) is associated with a higher bitrate than the encode 132(2), and the encode 132(2) is associated with a higher bitrate than the encode 132(1). Consequently, the total amount of encoded data included in a given encode 132 varies for the total amount of encoded data included in either of the other encodes 132. For each of the encodes 132, the vertical extent depicted in FIG. 2A reflects the total amount of encoded data associated with the encode 132. In some embodiments, each of the encoded chunks 132 included in a given encode 132 may be associated with a different bitrate.

Although not shown, as persons skilled in the art will recognize, the visual quality of each of the encoded chunks 134 typically varies from the visual quality of the other encoded chunks 134. For instance, the visual quality of a particular encoded chunk 134(n) typically increases as the bitrate increases and typically decreases as the complexity of the associated source chunk 220(n) increases.

Figure 2B:
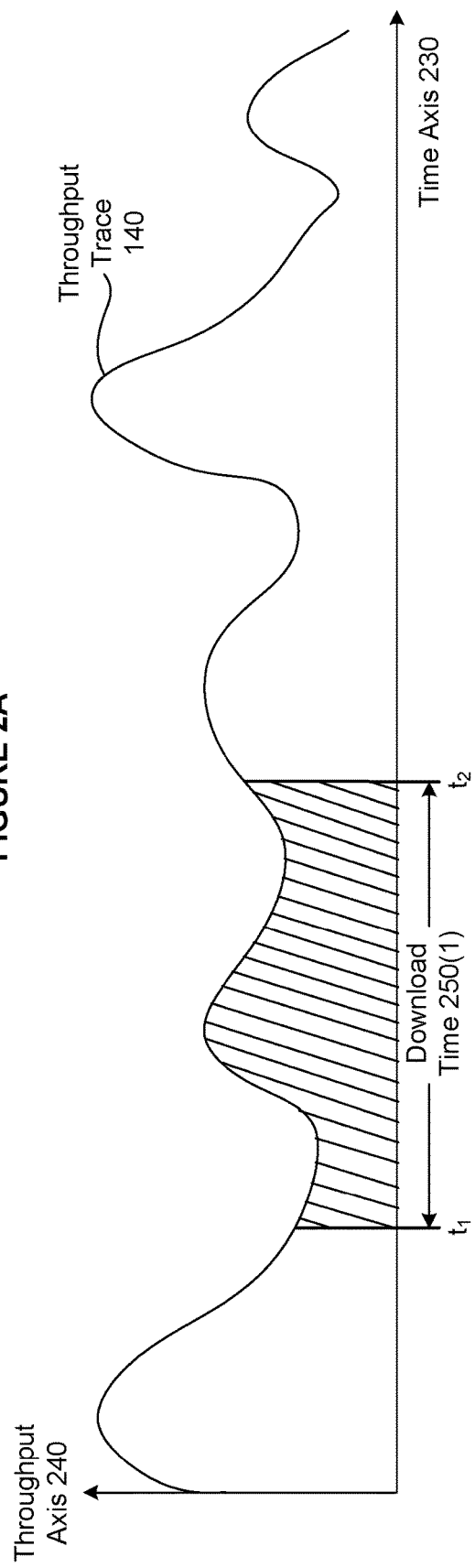
FIG. 2B illustrates an example of the throughput trace of FIG. 1, according to various embodiments of the present invention.

FIG. 2B illustrates an example of the throughput trace 140 of FIG. 1, according to various embodiments of the present invention. The value of the throughput trace 140 is depicted along a throughput axis 240 and varies based on the time depicted along the time axis 230. As described in conjunction with FIG. 1, the time duration D(n) required to download a given encoded chunk 134 is equal to the playback time that is depleted from the client buffer while the encoded chunk 134 downloads to the client device. In some embodiments, to calculate D(N) for a given encoded chunk 134 starting at a given time, the forward iteration engine 160 determines the area under the throughput trace 140 starting at the given time that is equal to a total data size associated with the encoded chunk 134.

Starting at a time t1, the area under the throughput trace 140 that is equal to the total data size associated with the encoded chunk 134(2) included in the encode 132(1) extends from t1 to t2 and is depicted with diagonal lines. Accordingly, the time required to download the encoded chunk 134(2) included in the encode 132(1) starting at the time t1 is the difference between t2 and t1. As the throughput trace 140 illustrates, the time required to download each encoded chunk 134 varies based on the time at which the download starts and the total size of encoded data included in the encoded chunk 134.

Determining an Optimized Sequence of Encoded Chunks

Figure 3:
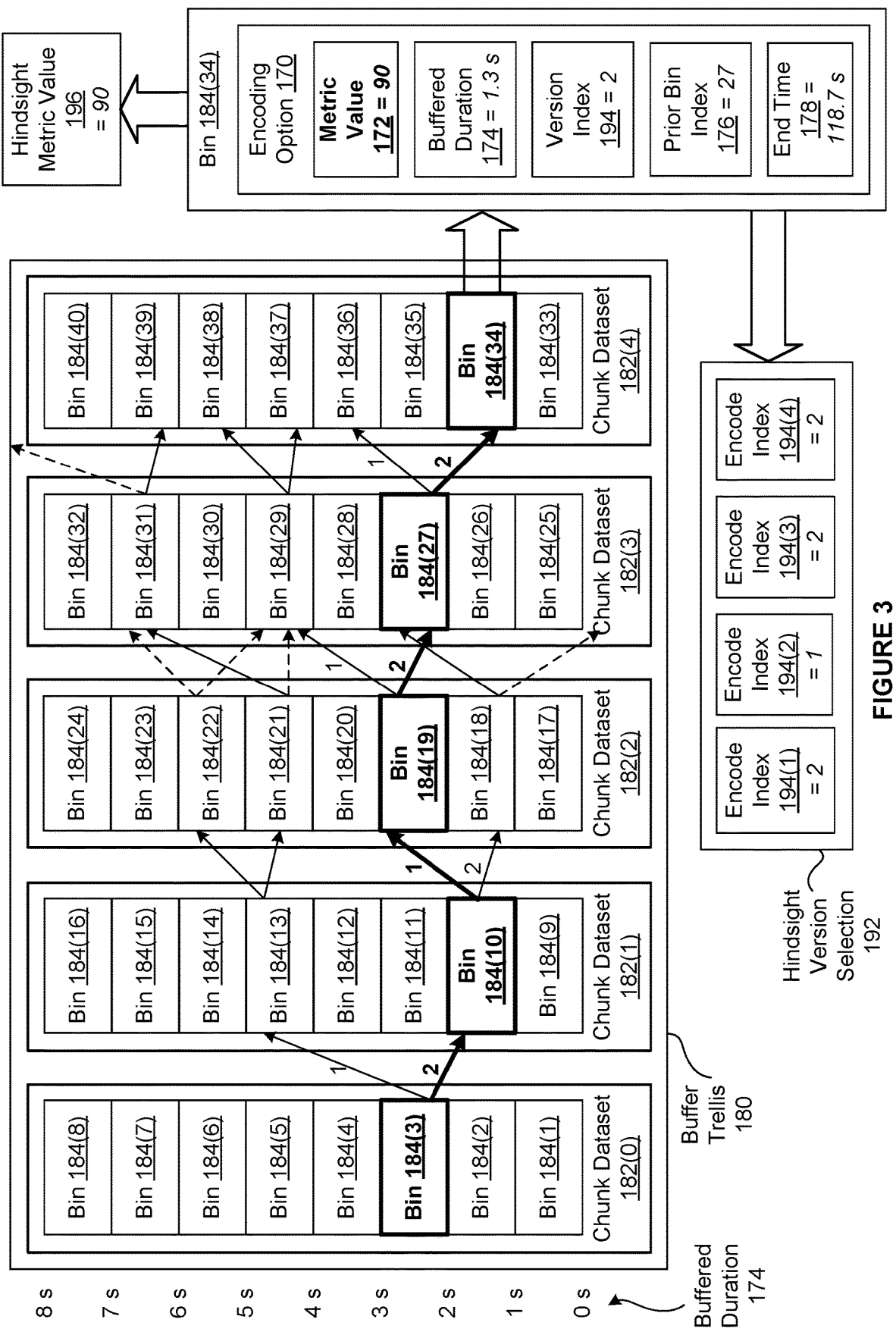
FIG. 3 illustrates how the hindsight application of FIG. 1 generates a hindsight version selection, according to various embodiments of the present invention.

FIG. 3 illustrates how the hindsight application 150 of FIG. 1 generates a hindsight version selection 192, according to various embodiments of the present invention. Although not shown in FIG. 3, the chunk map 130 includes, without limitation, two encodes 132(1)-132(2), and each of the encodes 132 includes, without limitation, four encoded chunks 134(1)-134(4).

First, the forward iteration engine 160 initializes the buffer trellis 180. As shown, the buffer trellis 180 includes, without limitation, five chunk datasets 182(0)-182(4). Each of the chunk datasets 182 includes, without limitation, eight bins 184. The chunk dataset 182(0) includes, without limitation, the bins 182(1)-182(8); the chunk dataset 182(1) includes, without limitation, the bins 182(9)-182(16); etc. The first bin 184 included in each of the chunk datasets 182 is associated with the buffered duration range of 0-1 seconds; the second bin 184 included in each of the chunk datasets 182(2) is associated with the buffered duration range of 1-2 seconds; and so forth. For example, the bins 184(1), 184(9), 184(17), 184(25), and 184(33) are associated with the buffered duration range of 0-1 seconds.

The forward iteration engine 160 populates the single bin 184(3) included in the chunk dataset 182(0) based on the initial buffered duration included in the buffer constraints 162. After setting the prior bin 184 equal to the bin 184(3), the forward iteration engine 160 generates a new encoding option 170 associated with a sequence of encoded chunks 134 that includes the single encoded chunk 134(1) of the encode 132(1). As depicted with the arrow labeled "1" that originates from the bin 184(3), the buffered duration 174 included in the new encoding option lies between 4 and 5 seconds. Accordingly, the forward iteration engine 160 stores the new encoding option 170 in the bin 184(13) included in the chunk dataset 182(1).

Subsequently, the forward iteration engine 160 generates a new encoding option 170 associated with a sequence of encoded chunks 134 that includes the single encoded chunk 134(1) of the encode 132(2). As depicted with the arrow labeled "2" that originates from the bin 184(3), the buffered duration 174 included in the new encoding option 170 lies between 1 and 2 seconds. Accordingly, the forward iteration engine 160 stores the new encoding option 170 in the bin 184(10) included in the chunk dataset 182(1). For each of the subsequent chunk datasets 182(2)-182(4), the forward iteration engine 160 continues to bifurcate from each populated bin 184 included in the chunk dataset 182(n−1) based on the choice of the encode 132. For example, as shown, the forward iteration engine 160 populates four bins 184 included in the chunk dataset 182(2).

Advantageously, as depicted with dashed arrows, as the forward iteration engine 160 populates the buffer trellis 180, the forward iteration engine 160 discards some of the sub-optimal encoding options 170. More precisely, the forward iteration engine 160 discards one of the new encoding options 170 based on the minimum buffer duration of 0 seconds. The forward iteration engine 160 discards another one of the new encoding options 170 based on the maximum buffer duration of 8 seconds. The forward iteration engine 160 discards five of the new encoding options 170 based on the optimization criterion 166.

For example, the forward iteration engine 160 maps three different encoding options 170 to the bin 184(29). As described in conjunction with FIG. 1, the forward iteration engine 160 stores at most one encoding option 170 per bin 184. Based on the optimization criterion 166 and the metric values 172 included in the three encoding options 170 that map to the bin 184(29), the forward iteration engine 160 discards two sub-optimal encoding options 170.

After the forward iteration engine 160 populates the final chunk dataset 182(4), the forward iteration engine 160 compares the metric values 172 stored in the five populated bins 184(34) and 184(36)-184(39). Based on the comparisons, the forward iteration engine 160 determines that the metric value 172 of 90 stored in the bin 184(34) is superior to the other four metric values 172 with respect to the optimization criterion 166. Accordingly, the forward iteration engine 160 selects the bin 184(34) as the current bin 184(34). The forward iteration engine 160 sets the hindsight metric value 196 equal to the metric value 172 of 90 stored in the current bin 184(34).

Subsequently, the backtrack engine 190 sets the hindsight version selection 192 equal to the version index 194 stored in the current bin 184(34). The backtrack engine 190 then performs backtracking operations to determine the complete hindsight version selection 192. The bins 144 associated with the backtracking operations are depicted in bold. First, the backtrack engine 190 performs backtracking operations based on the prior index 176 of 27 included in the current bin 184(34) to update the current bin 184 to the bin 184(27). The backtrack engine 190 prepends the version index 194 of 2 stored in the current bin 184(27) to the hindsight version selection 192. The backtrack engine 190 performs backtracking operations based on the prior index 176 of 19 to update the current bin 184 to the bin 184(19). The backtrack engine 190 prepends the version index 194 of 1 stored in the current bin 184(19) to the hindsight version selection 192. Subsequently, the backtrack engine 190 performs backtracking operations based on the prior index 176 of 10 to set the current bin 184 equal to the bin 184(10). The backtrack engine 190 prepends the version index 194 of 2 stored in the current bin 184(10) to the hindsight version selection 192. The backtrack engine 190 performs a final backtracking operation based on the prior index 176 of 3 to arrive at the initial bin 144.

As shown, after the backtrack engine 190 finishes performing backtracking operations, the hindsight version selection 192 specifies the optimized sequence of encoded chunks 194 associated with the hindsight metric value 196. The sequence of encoded chunks 194 is, in download order, the encoded chunk 194(1) of the encode 132(2), the encoded chunk 192(2) of the encode 132(1), the encoded chunk 194(3) of the encode 132(2), and the encoded chunk 194(4) of the encode 132(2).

Figure 4A:
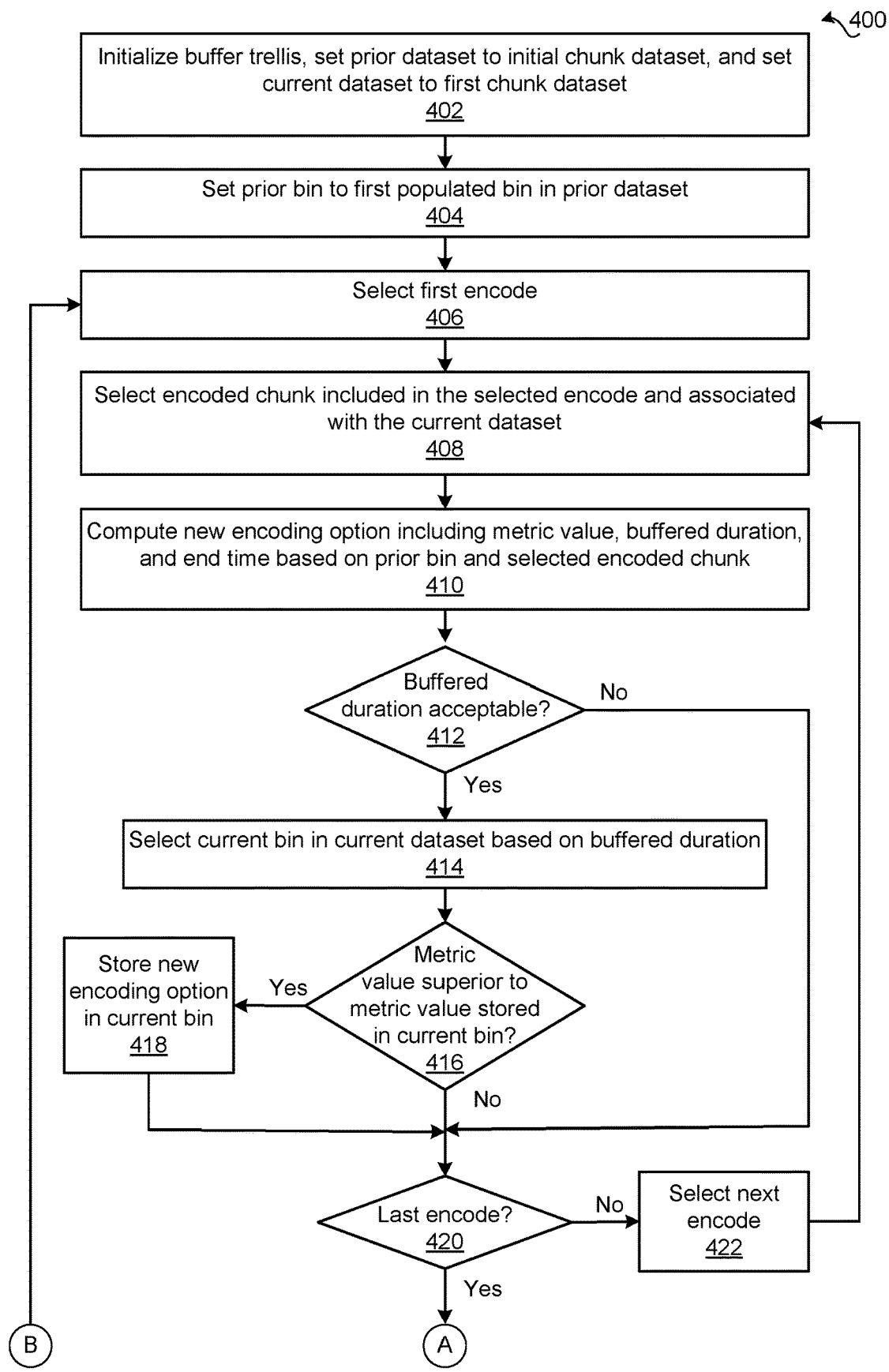
FIGS. 4A-4B set forth a flow diagram of method steps for generating a performance upper bound for a video rate selection algorithm, according to various embodiments of the present invention.
Figure 4B:
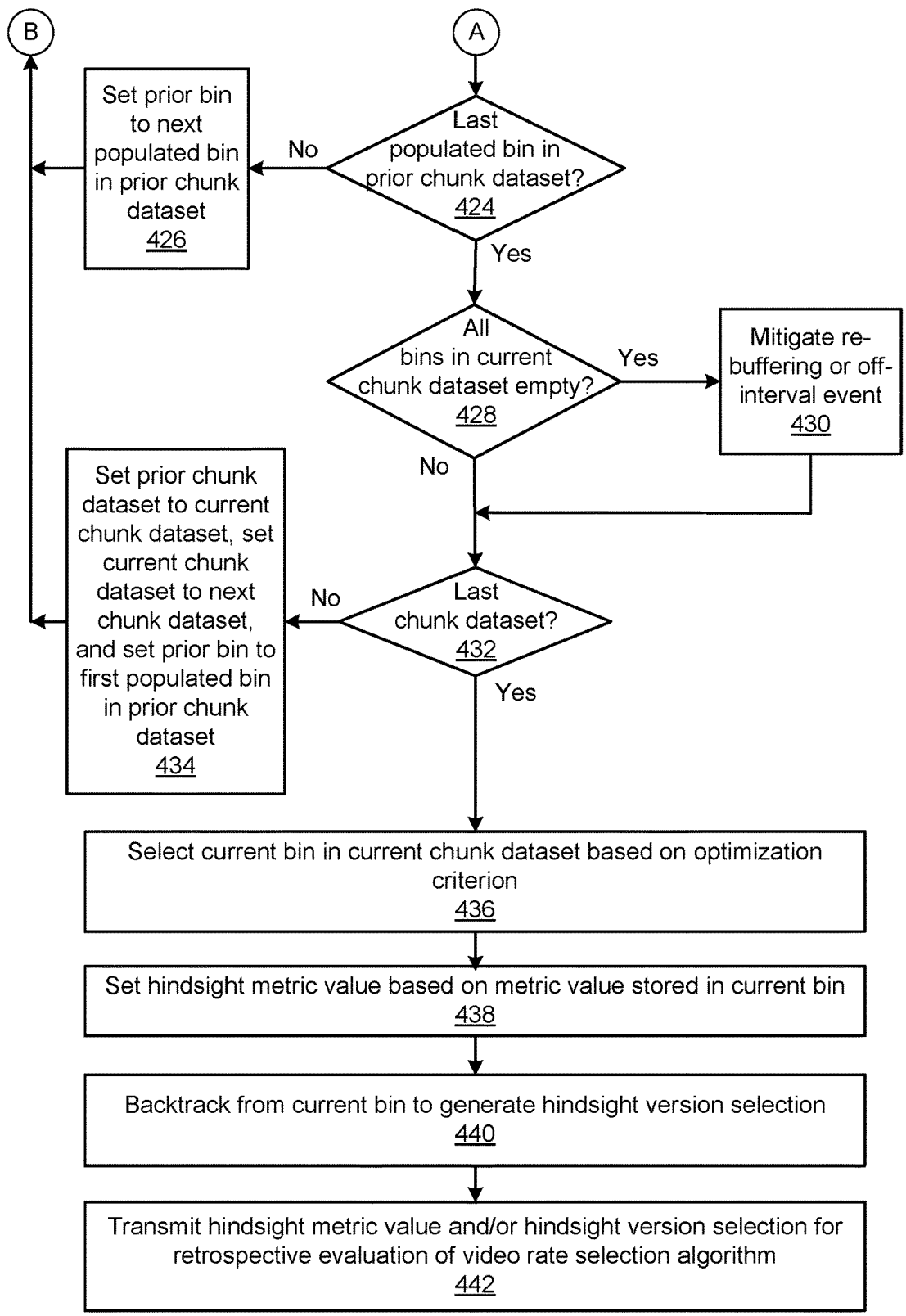

FIGS. 4A-4B set forth a flow diagram of method steps for generating a performance upper bound for a video rate selection algorithm, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the forward iteration engine 160 Initializes the buffer trellis 180, sets the prior dataset 182 equal to the initial chunk dataset 182(0), and sets the current chunk dataset 182 equal to the chunk dataset 182(1). At step 404, the forward iteration engine 160 sets the prior bin 184 equal to the first populated bin 184 included in the prior dataset 182. At step 406, the forward iteration engine 160 selects the first encode 132 included in the chunk map 130. At step 408, the forward iteration engine 160 selects the encoded chunk 134 included in the selected encode 132 and associated with the current chunk dataset 182.

At step 410, the forward iteration engine 160 computes a new encoding option 170 based on the prior bin 184 and the selected encoded chunk 134. The encoding option 170 includes, without limitation, the metric value 172, the buffered duration 174, and the end time 176. At step 412, the forward iteration engine 160 determines whether the buffered duration 174 is acceptable based on the buffer constraints 162. If, at step 412, the forward iteration engine 160 determines that the buffered duration 174 is acceptable, then the method 400 proceeds to step 414. At step 414, the forward iteration engine 160 selects one of the bins 184 included in the current chunk dataset 182 as the current bin 184 based on the buffered duration 174.

At step 416, the forward iteration engine 160 determines whether the metric value 172 included in the new encoding option 170 is superior to the metric value 172 stored in the current bin 184 with respect to the optimization criterion 166. If, at step 416, the forward iteration engine 160 determines that the metric value 172 included in the new encoding option 170 is superior to the metric value 172 stored in the current bin 184, then the method 400 proceeds to step 418. At step 418, the forward iteration engine 160 stores the new encoding option 170 in the current bin 184, overwriting the encoding option 170 previously stored in the current bin 184. If, however, at step 416, the forward iteration engine 160 determines that the metric value 172 included in the new encoding option 170 is not superior to the metric value 172 stored in the current bin 184, then the method 400 discards the new encoding option 170, and the method 400 proceeds directly to step 420.

Returning now to step 412, if the forward iteration engine 160 determines that the buffered duration 174 is not acceptable, then the forward iteration engine 150 discards the new encoding option 170, and the method 400 proceeds directly to step 420. At step 420, the forward iteration engine 160 determines whether the selected encode 132 is the last encode 132 included in the chunk map 130. If, at step 420, the forward iteration engine 160 determines that the selected encode 132 is not the last encode 132 included in the chunk map 130, then the method 400 proceeds to step 422. At step 422, the forward iteration engine 160 selects the next encode 132 included in the chunk map 130. The method 400 then returns to step 408, where the forward iteration engine 160 selects the encoded chunk 134 included in the selected encode 132 and associated with the current chunk dataset 182.

If, however, at step 420, the forward iteration engine 160 determines that the selected encode 132 is the last encode 132 included in the chunk map 130, then the method 400 proceeds directly to step 424. At step 424, the forward iteration engine 160 determines whether the prior bin 184 is the last populated bin 184 included in the prior dataset 182. If, at step 424, the forward iteration engine 150 determines that the prior bin 184 is not the last populated bin 184 included in the prior dataset 182, then the method 400 proceeds to step 426. At step 426, the forward iteration engine 160 sets the prior bin 184 equal to the next populated bin 184 included in the prior dataset 182. The method 400 then returns to step 406, where the forward iteration engine 160 selects the first encode 132 included in the chunk map 130.

If, however, at step 424, the forward iteration engine 160 determines that the prior bin 183 is the last populated bin 184 included in the prior dataset 182, then the method 400 proceeds directly to step 428. At step 428, the forward iteration engine 160 determines whether all the bins 184 included in the current chunk dataset 182 are empty. If, at step 428, the forward iteration engine 160 determines that all the bins 184 included in the current chunk dataset 182 are empty, then the method 400 proceeds to step 430. At step 430, the forward iteration engine 160 modifies the buffer trellis 180 to mitigate the re-buffering or off-interval event associated with the current chunk dataset 182.

If, however, at step 428, the forward iteration engine 160 determines that at least one of the bins 184 included in the current chunk dataset 182 is populated, then the method 400 proceeds directly to step 432. At step 432, the forward iteration engine 160 determines whether the current chunk dataset 182 is the last chunk dataset 182 included in the buffer trellis 180. If, at step 432, the forward iteration engine 160 determines that the current chunk dataset 182 is not the last chunk dataset 182 included in the buffer trellis 180, then the method 400 proceeds to step 434. At step 434, the forward iteration engine 160 sets the prior data set 182 equal to the current chunk dataset 182, sets the current chunk dataset 182 equal to the next chunk dataset 182, and sets the prior bin 184 to the first populated bin 194 included in the prior dataset 182. The method 400 then returns to step 406, where the forward iteration engine 160 selects the first encode 132 included in the chunk map 130.

If, however, at step 432, the forward iteration engine 160 determines that the current chunk dataset 182 is the last chunk dataset 182 included in the buffer trellis 180, then the method 400 proceeds direction to step 436. At step 436, the forward iteration engine 160 sets the current bin 144 to one of the bins 144 included in the current chunk dataset 142 based on the optimization criterion 166. At step 438, the forward iteration engine 160 set the hindsight metric value 196 equal to the metric value 172 stored in the current bin 144.

At step 440, the backtrack engine 190, performs backtracking operations starting from the current bin 144 to generate the hindsight version selection 192 associated with the hindsight metric value 196. At step 442, the hindsight application 150 transmits the hindsight metric value 196 and/or the hindsight version selection 192 for retrospective evaluation of a video rate selection algorithm that executed during the streaming session associated with the throughput trace 140. The method 400 then terminates.

In sum, the disclosed techniques may be used to efficiently and reliably evaluate a video rate selection algorithm. A hindsight application includes, without limitation, a forward iteration engine and a backtracking engine. First, the forward iteration engine generates and incrementally populates a buffer trellis based on a throughput trace of a completed streaming session and different encoded versions of a media title. The buffer trellis includes, without limitation, an initial chunk dataset and, for each source chunk included in the media title, a corresponding chunk dataset. Each chunk dataset includes, without limitation, a different set of bins. Within each set of bins, each bin corresponds to a different buffered duration range. A buffered duration is the total playback duration of encoded content stored in a client buffer. Initially, the forward iteration engine populates a single, initial bin in the initial chunk dataset, sets the prior dataset to the initial chunk dataset, and sets a current chunk dataset to the chunk dataset corresponding to the first source chunk.

To populate the current chunk dataset, the forward iteration engine individually processes each populated bin included in the prior dataset. For each such prior bin, the forward iteration engine computes M new encoding options, where M is the number of different encoded versions of the media title. For a given encoded version of the media title, the forward iteration engine selects the encoded chunk corresponding to the current chunk dataset. The forward iteration engine then computes a new encoding option based on a throughput trace, the prior bin, and the selected encoded chunk.

Each encoding option includes, without limitation, a quality metric value, a buffered duration, a version index, a prior bin index, and an end time. The version index specifies the corresponding encode 132 included in the chunk map 130, the prior bin index specifies the prior bin, and the end time specifies the time at which the selected encoded chunk finishes downloading. Based on the buffered duration, the forward iteration engine maps the encoding option to a "current" bin included in the current chunk dataset. If the current bin is already populated, then the forward iteration engine determines whether to overwrite the encoding option currently stored in the current bin with the new encoding option based on an optimization criterion. Notably, at any given time, each populated bin included in the buffer trellis stores a single encoding option.

After the forward iteration engine populates the last chunk dataset included in the buffer trellis, the forward iteration engine sets the current bin equal to a populated bin included in the last chunk dataset based on the optimization criterion. The forward iteration engine sets a hindsight metric value based on the metric value stored in the current bin and initializes a hindsight version selection to specify the version index stored in the current bin. A backtrack engine included in the hindsight application then sets a new current bin based on the prior bin index stored in the current bin. Subsequently, the backtrack engine prepends the version index stored in the new current bin to the hindsight version selection. The backtrack engine continues to perform backtracking operations in this fashion until reaching the initial bin. The complete hindsight version selection specifies an optimized sequence of encoded chunks that, together, span the playback time of the media title and are associated with the hindsight metric value.

At least one technological advantage of the disclosed techniques relative to prior art is that the hindsight application computes an accurate visual quality upper bound for a streaming session in a polynomial execution time. For instance, in some embodiments, the quality metric is a time-weighted video multimethod assessment fusion (VMAF) score and the optimization criterion configures the hindsight application to compute the maximum time-weighted VMAF score. The maximum time-weighted VMAF score accurately reflects the visual quality upper bound for the streaming session. Further, because the forward iteration engine progressively discards sub-optimal sequences based on buffered duration ranges, the time, computational resources, and storage resources required to determine the hindsight metric value are significantly reduced compared to prior art quality-based techniques. In particular, the execution time of the hindsight application is on the order of the product of the number of chunks, the number of buffered duration ranges, and the number of different encoded versions available for each chunk. These technical advantages provide a substantial technological advancement over prior art solutions.

1. In some embodiments, a computer-implemented method comprises computing a first encoding option associated with a first source chunk of a media title based on a network throughput trace and a buffer trellis; determining that the first encoding option is associated with a first buffered duration range; performing a comparison operation between a first metric value included in the first encoding option and a second metric value included in a second encoding option, wherein the second encoding option is stored in the buffer trellis and also is associated with the first buffered duration range; determining that the first encoding option is associated with a higher visual quality than the second encoding option based on the comparison operation; storing the first encoding option instead of the second encoding option in the buffer trellis to generate a modified buffer trellis; and computing a hindsight metric value associated with a sequence of encoded chunks of the media title based on the modified buffer trellis, wherein the hindsight metric value is used to evaluate the performance of a video rate selection algorithm.

2. The computer-implemented method of clause 1, further comprising performing one or more backtracking operations on the modified buffer trellis to generate a hindsight version selection, wherein the hindsight version selection specifies the sequence of encoded chunks and is used to further evaluate the performance of the video rate selection algorithm.

3. The computer-implemented method of clause 1 or 2, wherein computing the hindsight metric comprises generating a third encoding option associated with a second source chunk of the media title based on the first encoding option; storing the third encoding option in the modified buffer trellis to generate a further modified buffer trellis; performing a second comparison operation between a third metric value included in the third encoding option and a fourth metric value included in a fourth encoding option, wherein the fourth encoding option is stored in the further modified buffer trellis and also is associated with the second source chunk; determining that the third encoding option is associated with a higher visual quality then the fourth encoding option based on the second comparison operation; and setting the hindsight metric value equal to the third metric value.

4. The computer-implemented method of any of clauses 1-3, wherein computing the first encoding option comprises calculating a first buffered duration based on a time required to download a first encoded chunk derived from the first source chunk, a playback duration associated with the first source chunk, and a second buffered duration included in a third encoding option associated with a second source chunk of the media title.

5. The computer-implemented method of any of clauses 1-4, further comprising computing the time required to download the first encoded chunk based on an integral of the network throughput trace with respect to time and a bitrate associated with the first encoded chunk.

6. The computer-implemented method of any of clauses 1-5, wherein determining that the first encoding option is associated with the first buffered duration range comprises mapping the first buffered duration to the first buffered duration range.

7. The computer-implemented method of any of clauses 1-6, wherein computing the first encoding option comprises calculating a first quality score based on an encoded chunk derived from the first source chunk; and calculating the first metric value based on the first quality score and a third metric value included in a third encoding option that is stored in the buffer trellis.

8. The computer-implemented method of any of clauses 1-7, wherein the first metric value comprises a cumulative time-weighted visual quality score associated with one or more encoded chunks or a cumulative worst-case visual quality score associated with the one or more encoded chunks, wherein the one or more encoded chunks include a first encoded chunk derived from the first source chunk.

9. The computer-implemented method of any of clauses 1-8, wherein the first encoding option is associated with a first bitrate, and the second encoding option is associated with a second bitrate that is different than the first bitrate.

10. The computer-implemented method of any of clauses 1-9, wherein the hindsight metric value comprises a time-weighted video multimethod assessment fusion (VMAF) score, a time-weighted harmonic VMAF score, a worst-case VMAF score, or a time-weighted bitrate.

11. In some embodiments, a non-transitory computer-readable storage medium includes instructions that, when executed by a processor, cause the processor to perform the steps of partitioning a total range associated with a client device buffer into a plurality of buffered duration ranges; computing a first encoding option associated with a first source chunk of a media title based on a network throughput trace and a buffer trellis that is associated with the plurality of buffered duration ranges; determining that the first encoding option is associated with a first buffered duration range included in the plurality of buffered duration ranges; performing a comparison operation between a first metric value included in the first encoding option and a second metric value included in a second encoding option, wherein the second encoding option is stored in the buffer trellis and also is associated with the first buffered duration range; determining that the first encoding option is associated with a higher visual quality than the second encoding option based on the comparison operation; storing the first encoding option instead of the second encoding option in the buffer trellis to generate a modified buffer trellis; and computing a hindsight metric value associated with a sequence of encoded chunks of the media title based on the modified buffer trellis, wherein the hindsight metric value is used to evaluate the performance of a video rate selection algorithm.

12. The non-transitory computer-readable storage medium of clause 11, further comprising performing one or more backtracking operations on the modified buffer trellis to generate a hindsight version selection, wherein the hindsight version selection specifies the sequence of encoded chunks and is used to further evaluate the performance of the video rate selection algorithm.

13. The non-transitory computer-readable storage medium of clauses 11 or 12, wherein computing the hindsight metric comprises generating a third encoding option associated with a second source chunk of the media title based on the first encoding option; storing the third encoding option in the modified buffer trellis to generate a further modified buffer trellis; performing a second comparison operation between a third metric value included in the third encoding option and a fourth metric value included in a fourth encoding option, wherein the fourth encoding option is stored in the further modified buffer trellis and also is associated with the second source chunk; determining that the third encoding option is associated with a higher visual quality then the fourth encoding option based on the second comparison operation; and setting the hindsight metric value equal to the third metric value.

14. The non-transitory computer-readable storage medium of any of clauses 11-13, wherein computing the first encoding option comprises calculating a first buffered duration based on a time required to download a first encoded chunk derived from the first source chunk, a playback duration associated with the first source chunk, and a second buffered duration included in a third encoding option associated with a second source chunk of the media title.

15. The non-transitory computer-readable storage medium of any of clauses 11-14, further comprising computing an area under the network throughput trace that is equal to a total data size of the first encoded chunk to calculate the time required to download the first encoded chunk.

16. The non-transitory computer-readable storage medium of any of clauses 11-15, wherein the hindsight metric value comprises a time-weighted video multimethod assessment fusion (VMAF) score, a time-weighted harmonic VMAF score, a worst-case VMAF score, or a time-weighted bitrate.

17. The non-transitory computer-readable storage medium of any of clauses 11-16, further comprising, prior to performing the comparison operation, mapping the first source chunk to a first chunk dataset included in the buffer trellis; mapping a first buffered duration included in the first encoding option to a first bin included in the first chunk dataset; and determining that the second encoding option is stored in the bin.

18. The non-transitory computer-readable storage medium of any of clauses 11-17, wherein the first encoding option is associated with a first plurality of encoded chunks that includes a first encoded chunk derived from a second source chunk, and the second encoding option is associated with a second plurality of encoded chunks that includes a second encoded chunk derived from the second source chunk.

19. In some embodiments, a system comprises a memory storing instructions; and a processor that is coupled to the memory and, when executing the instructions, is configured to compute a first visual quality score included in a first encoding option based on a buffer trellis and a first encoded chunk of a media title derived from a first source chunk of a media title; determine that the first encoding option is associated with a first buffered duration range based on a network throughput trace and the buffer trellis; perform a comparison operation between the first visual quality score and a second visual quality score included in a second encoding option, wherein the second encoding option is stored in the buffer trellis and also is associated with the first buffered duration range; determine that the first encoding option is associated with a higher visual quality than the second encoding option based on the comparison operation; store the first encoding option instead of the second encoding option in the buffer trellis to generate a modified buffer trellis; and compute a hindsight visual quality score associated with a sequence of encoded chunks of the media title based on the modified buffer trellis, wherein the hindsight visual quality score is used to evaluate the performance of a video rate selection algorithm.

20. The system of clause 19, wherein the processor is further configured to perform one or more backtracking operations on the modified buffer trellis to generate a hindsight version selection, wherein the hindsight version selection specifies the sequence of encoded chunks and is used to further evaluate the performance of the video rate selection algorithm.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for playing back a first media title on an endpoint device, the method comprising:
    selecting, via a video rate selection algorithm, an encoded chunk from a plurality of encoded chunks associated with the first media title based on a current network throughput, wherein the video rate selection algorithm is configured according to an upper bound for visual quality that is computed based on a buffer trellis storing a plurality of encoding options associated with a second media title, wherein a first encoding option has a visual quality that is greater than a second encoding option, and the first encoding option replaces the second encoding option in a bin of the buffer trellis associated with a first chunk of the second media title; and
    requesting the encoded chunk from a server machine for playback.

2. The computer-implemented method of claim 1, wherein the first encoding option stored in the bin of the buffer trellis associated with the first chunk of the second media title is associated with a first buffered duration range.

3. The computer-implemented method of claim 2, wherein the first encoding option is stored in the bin of the buffer trellis to replace the second encoding option that is also associated with the first chunk of the second media title and the first buffered duration range upon determining that the first encoding option is associated with the higher visual quality than the second encoding option.

4. The computer-implemented method of claim 2, wherein the first encoding option is stored in the bin of the buffer trellis to replace the second encoding option upon comparing a first cumulative quality score associated with the first encoding option and a second cumulative quality score associated with the second encoding option.

5. The computer-implemented method of claim 1, wherein the first encoding option is associated with a first encoded chunk derived from the first chunk of the second media title and is stored in the bin of the buffer trellis based on a first buffered duration associated with the first encoded chunk.

6. The computer-implemented method of claim 5, wherein the first buffered duration is computed based on a time required to download the first encoded chunk, a playback duration associated with the first chunk, and a previous buffered duration associated with a third encoding option stored in the buffer trellis.

7. The computer-implemented method of claim 5, wherein a time required to download the first encoded chunk is computed based on a network throughput trace associated with the second media title.

8. The computer-implemented method of claim 1, wherein the upper bound for visual quality is determined based on a subset of the encoding options that are stored in the buffer trellis and are associated with a final chunk of the second media title.

9. The computer-implemented method of claim 1, wherein the upper bound for visual quality is determined by comparing a plurality of cumulative quality scores associated with a subset of encoding options that are stored in the buffer trellis to determine a highest cumulative quality score.

10. The computer-implemented method of claim 1, wherein the upper bound for visual quality comprises a time-weighted video multimethod assessment fusion ("VMAF") score, a time-weighted harmonic VMAF score, or a worst-case VMAF score.

11. One or more non-transitory computer-readable media storing instructions that, when executed by one or more processors, cause the one or more processors to perform the steps of:
　　selecting an encoded chunk from a plurality of encoded chunks associated with the first media title based on a current network throughput, wherein the video rate selection algorithm is configured according to an upper bound for visual quality that is computed based on a buffer trellis storing a plurality of encoding options associated with a second media title, wherein a first encoding option has a visual quality that is greater than a second encoding option, and the first encoding option replaces the second encoding option in a bin of the buffer trellis associated with a first chunk of the second media title; and
　　requesting the encoded chunk from a server machine for playback.

12. The one or more non-transitory computer-readable media of claim 11, wherein the first encoding option stored in the bin of the buffer trellis associated with the first chunk of the second media title is associated with a first buffered duration range.

13. The one or more non-transitory computer-readable media of claim 12, wherein the first encoding option is stored in the bin of the buffer trellis to replace the second encoding option that is also associated with the first chunk of the second media title and the first buffered duration range upon determining that the first encoding option is associated with the higher visual quality than the second encoding option.

14. The one or more non-transitory computer-readable media of claim 12, wherein the first encoding option is stored in the bin of the buffer trellis to replace the second encoding option upon comparing a first cumulative quality score associated with the first encoding option and a second cumulative quality score associated with the second encoding option.

15. The one or more non-transitory computer-readable media of claim 11, wherein the first encoding option is associated with a first encoded chunk derived from the first chunk of the second media title and is stored in the bin of the buffer trellis based on a first buffered duration associated with the first encoded chunk.

16. The one or more non-transitory computer-readable media of claim 15, wherein the first buffered duration is computed based on a time required to download the first encoded chunk, a playback duration associated with the first chunk, and a previous buffered duration associated with a third encoding option stored in the buffer trellis.

17. The one or more non-transitory computer-readable media of claim 15, wherein a time required to download the first encoded chunk is computed based on a network throughput trace associated with the second media title.

18. The one or more non-transitory computer-readable media of claim 11, wherein the upper bound for visual quality is determined based on a subset of the encoding options that are stored in the buffer trellis and are associated with a final chunk of the second media title.

19. The one or more non-transitory computer-readable media of claim 11, wherein the upper bound for visual quality is determined by comparing a plurality of cumulative quality scores associated with a subset of encoding options that are stored in the buffer trellis to determine a highest cumulative quality score.

20. The one or more non-transitory computer-readable media of claim 11, wherein the upper bound for visual quality comprises a time-weighted video multimethod assessment fusion ("VMAF") score, a time-weighted harmonic VMAF score, or a worst-case VMAF score.

21. A computer system, comprising:
　　one or more memories storing instructions; and
　　one or more processors that are coupled to the one or more processors and, when executing the instructions, are configured to:
　　　　select an encoded chunk from a plurality of encoded chunks associated with the first media title based on a current network throughput, wherein the video rate selection algorithm is configured according to an upper bound for visual quality that is computed based on a buffer trellis storing a plurality of encoding options associated with a second media title, wherein a first encoding option has a visual quality that is greater than a second encoding option, and the first encoding option replaces the second encoding option in a bin of the buffer trellis associated with a first chunk of the second media title; and
　　　　request the encoded chunk from a server machine for playback.

* * * * *